UNITED STATES PATENT OFFICE 2,680,692

STABILIZED ALUMINA HEAT EXCHANGE PEBBLE

Sam P. Robinson, Bartlesville, Okla., assignor to Phillips Petroleum Company, a corporation of Delaware No Drawing. Application October 24, 1949,
Serial No. 123,299

7 Claims. (Cl. 106—62)

This invention relates to stabilized alumina heat-exchange pebbles having high resistance to cyclic thermal and mechanical shock and to a method for their preparation. The invention is also concerned with the use of such pebbles in heat exchange processes involving extreme thermal and mechanical shock.

Pebble heater techniques being developed and applied to various gas heating, treating, and reaction processes at the present time make use of a compact stream of small refractory pebbles as a moving heat-exchange medium. These pebbles which are usually ceramic materials, although they may be metallic for some applications, are spheres ranging in size from about 1/8" to 1" in diameter. They may be either catalytic or non-catalytic in a given application. In typical pebble heater operation, a continuous compact mass of pebbles descends by gravity through a series of treating zones and upon emerging from the lowermost zone, they are elevated by a suitable elevator, usually of the bucket type, to a point above the uppermost zone for again gravitating through the system. The uppermost zone is usually a pebble heating zone where the pebbles are contacted in countercurrent flow with a stream of hot combustion gas so as to raise their temperature to a desired degree as they descend through the heating zone. The heated pebbles then pass into a reaction or gas heating zone where they impart heat to the gas being treated and in turn are cooled and require reheating. In some installations, a feed gas preheating zone is positioned just below the reaction or gas treating zone so as to further cool the pebbles before elevation and to preheat the feed gas to the reaction zone. Other installations utilize a pebble preheating zone positioned directly above the pebble heating zone proper where the pebbles are contacted with the effluent from the reaction zone so as to recover a substantial portion of the sensible heat thereof and simultaneously quench the reaction product.

In another type of pebble heat-exchange process, a gravitating mass of pebbles is utilized to maintain a cold zone or to cool a gas. The pebbles are cooled by contact with a cold gas in one chamber and the cold pebbles are then gravitated through a second chamber in contact with the gas to be cooled. In such processes the pebbles undergo great differences in temperature with the usual mechanical shock and attrition forces involved in gravitating masses of pebbles.

The pebbles of the invention are utilized to advantage in such processes as those disclosed in my copending applications Serial No. 651,293, filed March 1, 1946, now abandoned, involving the production of $CS_2$, and Serial No. 662,149, filed April 15, 1946, now Patent No. 2,647,041, dated July 28, 1953, relating to the cracking of hydrocarbons to hydrogen and coke, as well as in the process of the copending application of M. O. Kilpatrick, Serial No. 761,696, filed July 17, 1947, now abandoned, relating to the thermal conversion of hydrocarbons to more desirable hydrocarbons. These processes involve temperature changes of the order of 1000 to 2000° F. per minute, with severe mechanical shock and abrasive forces present.

The pebble heater finds its greatest utility in operations which require extremely fast heating rates and therefore extremely fast pebble cooling rates with concomitant thermal shock to the pebbles. In pebble heater processes involving more severe heating and cooling requirements, the pebbles are subjected to heating rates greater than 1000° F. per minute and cooling rates of more than 2000° F. per minute at maximum temperatures in the neighborhood of 3000° F. In addition to the severe thermal shock resulting from such rapid temperature changes, the pebbles are subjected to considerable mechanical shock in passing through the apparatus, especially in the elevator equipment and in dropping from the top of the elevator into the top of the pebble heating zone. It is found that considerable breakage and loss of pebbles occurs when using conventional commercial pebbles under such severe conditions of operation.

It has been found that commercially available high purity alumina pebbles while having some very desirable characteristics have not been very satisfactory in commerical operation. Exposed to fast cooling shock at high temperatures, alpha corundum crystals tend to grow. Repeated firing to high temperature levels accelerates this growth which takes place at the expense of smaller alumina crystals in the sintered bond by cannibalization. After a certain time the pebbles begin to have a granular structure replete with large cracks throughout the body. Mechanical shock such as dropping into elevating or conveying equipment soon fractures a large quantity of such pebbles because of gradual disappearance of the strong but small bonding crystals. Crystal growth also renders the pebbles less attrition resistant.

In addition because of the purity of the pebbles and their consequent high melting point, it is necessary to sinter new pebbles in their manufacture at very high temperatures in order to develop good bond strength. With pure pebbles such as 99% Al₂O₃ commercial grades, one obtains large surface crystals if firing temperatures are maintained high enough to develop good bond strength. Because of the high purity, the surface crystal edges are quite sharp and well defined. Such crystals cause very high attrition losses in service which helps to make such types of pebbles very unsuited economically for pebble heater use because of high breakage and attrition losses and the consequent need for high makeup purchases.

In a pebble heater process requiring the circulation of between 25,000 and 35,000 pounds of pebbles per hour with a temperature shock of approximately 1000° F. per minute the attrition and breakage loss on the best available commercially produced alumina pebble amounts to at least 200 pounds per day and runs as high as 700 pounds per day. This represents a loss of between 0.8 and 2% per day. The alumina pebbles were selected as the best available commercial pebbles. This substantial loss of pebbles due to attrition and breakage merely emphasizes the need for a rugged, attrition, and shock resistant pebble. It is with the improvement of high purity alumina pebble characteristics that this invention is concerned.

A principal object of the invention is to provide an alumina pebble of improved resistance to breakage under severe cyclic thermal and mechanical shock conditions. It is also an object of the invention to provide a method of producing an alumina pebble stabilized against growth of alpha corundum crystals. Another object is to provide improved heat-exchange processes effected in the presence of the stabilized alumina pebbles of the invention. Other objects of the invention will become apparent from a consideration of the accompanying disclosure.

The invention involves bonding and stabilizing alumina crystals against further growth by incorporation of certain metal silicates in high purity alumina pebbles. It is found that magnesium silicate and calcium silicate and the mixed silicates of magnesium and calcium when incorporated in amounts between 0.5 and 10 per cent by weight of the alumina have a deterrent effect upon crystal growth of the alpha corundum during the firing of the pebbles. These silicates have the following melting points:

| | ° F. |
|---|---|
| $CaO \cdot SiO_2$ | 2753 |
| $MgO \cdot SiO_2$ | 2850 |
| $CaO \cdot MgO \cdot SiO_2$ | 2735 |
| $CaO \cdot MgO \cdot 2SiO_2$ | 2550 |
| $2CaO \cdot MgO \cdot 2SiO_2$ | 2660 |

Apparently these metal silicates form a viscous semi-liquid around the alpha corundum crystals during the firing of the pebbles before any appreciable alpha corundum crystal growth takes place and therefore act as a deterrent in preventing crystal growth of the alumina which would normally take place at the firing temperatures required to form well bonded alumina pebbles.

The pebble making process entails forming a homogeneous mixture of high purity alumina in powdered form and finely comminuted metal oxides of the class described, together with finely comminuted silica in stoichiometric proportions, preparing a plastic extrudable mix of these constituents with the aid of a binder such as water and/or a volatile organic binder and lubricant including Sterotex (hydrogenated corn oil), any of the synthetic or natural resins, petroleum pitch, naphthalene, stearic acid, aluminum stearate, carboxymethyl cellulose, molasses, sugar, dextrin, glue, shellac, etc., and compacting the mix into small spheres of the order of ⅛″ to 1″ in diameter. It is desirable to incorporate in the pebble mix one or more of the aforesaid binders in the total amount in the range of 3 to 15 per cent based on the weight of the solid constituents. The amount of binder utilized should be such that the unfired balls hold their shape until hardened in the subsequent firing step.

While any of the conventional pebble forming methods may be utilized in forming the pebble constituents into homogeneous spheres or balls, a preferred method comprises forming a plastic extrudable mix of the selected constituents, extruding the mix into rods of a diameter approximating the desired pebble diameter, cutting the rods into slugs of a length approximating their diameter, and then tumbling the slugs in a three-dimensional tumbling drum until the slugs are shaped into substantially spherical balls.

The alumina for the pebbles of the invention may be incorporated in the mix in the form of alpha corundum or gamma alumina. The hydrated aluminas, which are converted to alpha corundum through the gamma alumina form when heated at elevated temperatures, and aluminum hydroxide should be lightly calcined in the range of 1000 to 2500° F. before incorporating them in the pebble mix. It is desirable that the alumina be of high purity, e. g. 99% or higher. Purified bauxite, precipitated alumina hydroxide, and the alumina manufactured by the Bayer process are examples of raw materials for the alumina. A preferred alumina is the finely comminuted precalcined crypto-crystalline alpha corundum formed by calcining Bayer process alumina at temperatures up to 2100° F. The alumina raw material should be sufficiently finely comminuted to pass a 150-mesh screen and it is preferred that it be sufficiently fine to pass a 325-mesh screen. It is important that all of the raw materials in the pebble mix be of this fineness so as to form an extremely intimate homogeneous mixture of the pebble constituents and thereby produce a uniform, smooth, well bonded pebble in which the alpha corundum crystals are of an average size less than 25 microns.

The silica raw material for the pebble mix may be selected from any of the relatively pure commercial silicas, such as powdered silica gel, silica sand, etc. Any of the relatively pure magnesium oxide and calcium oxide raw materials may be incorporated in the mix. When using pure calcium and magnesium oxides it is preferred to use calcined, crushed, air-floated dolomite.

The critical firing temperature for the compacted balls of alumina, silica, and metal oxides is found to lie in the range of 2850 to 3200° F. When the pebbles are fired at lower temperatures, the bond is apparently not sufficiently developed and when firing above this range the pebbles are apparently too hard and rigid under conditions of cyclic thermal and mechanical shock and have poor attrition resistance in pebble heater operation. Firing in the above range must be continued for at least two hours at the upper temperature and twelve hours at the lower temperature of the range and until the porosity of the pebbles lies in the range of 5 to 16% and preferably 8 to 10% (porosity includes both available and unavailable porosity). Pebbles prepared and fired according to the inventive procedure are fine grained, hard, smooth, and yet elastic enough to withstand mechanical and thermal shock in alternate cycles for extended periods of time. The average crystal size of the alumina (alpha corundum) crystals is less than 25 microns which assures long pebble life, especially because of the stabilizing effect of the bonding silicate in the pebble.

The following examples illustrate the invention but are not to be construed as unduly and unnecessarily limiting the same.

Example I 975 pounds of Bayer alumina precalcined to 2100° F. and screened so that all passes 200-mesh screen and more than half passes 325-mesh is mixed with 15 pounds of hydro-separated glass quality $SiO_2$, passing a 200-mesh screen and 10 pounds of light low iron calcined MgO, also passing 200-mesh, and 60 pounds of Sterotex. The mixture is thoroughly mixed and plasticized in muller-type pan mills before feeding to an auger extrusion press with automatic slicing devices to produce cylinders approximately ⅜" in diameter by ⅜" in length. These slugs are tumbled into spheres in tumbling drums designed for three-dimensional rotation. The resulting spheres are given a light heating to drive off the Sterotex and the Sterotex-free spheres are then heated to 3000° F. for 24 hours so as to develop a pebble of 8 to 10 per cent porosity. The resulting pebbles which are approximately $\frac{5}{16}$" in diameter have an average crushing strength of 1500 pounds applied between parallel plates and are highly resistant to attrition, heat and mechanical shock at high temperatures without further appreciable alpha corundum crystal growth.

Example II 970 pounds of Bayer process alumina of 325-mesh and finer is mixed with 18 pounds of "dolime" (CaO·MgO) of 200 mesh and finer, 12 pounds of silica gel of 200-mesh and finer, and 65 pounds of Sterotex are thoroughly mixed and ground together in muller-type pan mills until a homogeneous plastic mix of the constituents is formed. The resulting mix is extruded into cylindrical rods ⅜" in diameter and automatically cut into ⅜" slugs in an auger-type extrusion press having automatic slicing devices. These slugs are tumbled into spheres in three-dimensional tumbling drums. The spheres are lightly calcined to drive off the Sterotex and the firing temperature is gradually and slowly increased to about 2950° F., at which temperature the balls are held 20 hours. The fired spheres are slowly cooled to room temperature over a period of 30 hours and are found to have a porosity in the range of 8 to 10 per cent, an average crushing strength of 1550 pounds and are comparable in smoothness, attrition resistance, and fineness of alumina crystals to the pebbles of Example I.

Certain modifications of the invention will become apparent to those skilled in the art and the illustrative details disclosed are not to be construed as imposing unnecessary limitations on the invention.

I claim:

1. A process for manufacturing heat-exchange pebbles which comprises preparing a plastic homogeneous mix of powdered alumina prefired in the range of 1000 to 2500° F., powdered silica, and at least one powdered metal oxide selected from the group consisting of magnesium oxide and calcium oxide together with a volatile plasticizing binder, the metal oxide and silica in the mix being in stoichiometric proportions to form silicates in an amount in the range of 0.5 to 10 weight per cent of the alumina, forming said mix into small compact spheres, firing said spheres at a temperature in the range of 2850 to 3200° F., for a period of at least 2 hours and until the porosity of the spheres lies in the range of 5 to 16%.

2. The process of claim 1 in which magnesium oxide is selected as the metal oxide.

3. The process of claim 1 in which calcium oxide is selected as the metal oxide.

4. The process of claim 1 in which both magnesium oxide and calcium oxide are incorporated in the mix.

5. As an article of manufacture, a smooth-surfaced refractory pebble of 5 to 16% porosity having high resistance to thermal and mechanical shock consisting essentially of at least 90 weight per cent alpha alumina of an average crystal size less than 25 microns and a minimum of 0.5 weight per cent of silicate selected from the group consisting of magnesium and calcium silicates, the silicate being dispersed amongst the alumina crystals in haphazard orientation and having been produced in situ by reacting the metal oxide with silica by firing at a temperature in the range of 2850 to 3200° F.

6. As an article of manufacture, a smooth-surfaced refractory pebble of 5 to 16% porosity having high resistance to thermal and mechanical shock and a crushing strength of at least 1500 pounds (based on a $\frac{5}{16}$" pebble) and consisting essentially of at least 90 weight per cent alpha alumina of an average crystal size less than 25 microns and a minimum of 0.5 weight per cent magnesium silicate, the silicate being dispersed amongst the alumina crystals in haphazard orientation and having been produced in situ by reacting magnesium oxide with silica by firing at a temperature in the range of 2850 to 3200° F.

7. As an article of manufacture, a smooth-surfaced refractory pebble of 5 to 16% porosity having high resistance to thermal and mechanical shock and a crushing strength of at least 1500 pounds (based on a $\frac{5}{16}$" pebble) and consisting essentially of at least 90 weight per cent alpha alumina of an average crystal size less than 25 microns and a minimum of 0.5 weight per cent calcium magnesium silicate, the silicate being dispersed amongst the alumina crystals in haphazard orientation and having been produced in situ by reacting calcium and magnesium oxides with silica by firing at a temperature in the range of 2850 to 3200° F.

References Cited in the file of this patent

UNITED STATES PATENTS

| Number | Name | Date |
|---|---|---|
| Re. 22,648 | Heany | June 5, 1945 |
| 1,178,667 | Niewerth | Apr. 11, 1916 |
| 2,045,494 | Riddle | June 23, 1936 |
| 2,046,764 | Benner et al. | July 7, 1936 |
| 2,108,513 | Shardlow | Feb. 15, 1938 |
| 2,304,133 | Brookline et al. | Dec. 8, 1942 |
| 2,348,847 | Pike | May 16, 1944 |
| 2,391,454 | Heany | Dec. 25, 1945 |
| 2,423,958 | Austin et al. | July 15, 1947 |
| 2,448,257 | Evans | Aug. 31, 1948 |
| 2,460,811 | Davies et al. | Feb. 8, 1949 |
| 2,478,757 | Foster | Aug. 9, 1949 |
| 2,494,276 | Austin et al. | Jan. 10, 1950 |
| 2,494,277 | Austin et al. | Jan. 10, 1950 |